United States Patent [19]

Takawashi et al.

[11] Patent Number: 4,554,428

[45] Date of Patent: Nov. 19, 1985

[54] ELECTROSPARK MACHINING CONTROL DEVICE

[75] Inventors: Tamio Takawashi; Toshimitsu Sakakibara; Shigeo Yamada, all of Aichi, Japan

[73] Assignee: Mitsubishi Denki Kabushiki Kaisha, Tokyo, Japan

[21] Appl. No.: 636,087

[22] Filed: Aug. 2, 1984

Related U.S. Application Data

[63] Continuation of Ser. No. 352,433, Feb. 25, 1982, abandoned.

[30] Foreign Application Priority Data

Feb. 28, 1981 [JP] Japan ................................. 56-28958

[51] Int. Cl.$^4$ .............................................. B23P 1/14
[52] U.S. Cl. .................................. 219/69 G; 219/69 C
[58] Field of Search ........................... 219/69 G, 69 C

[56] References Cited

U.S. PATENT DOCUMENTS 4,339,650 7/1982 Tanaka et al. ..................... 219/69 G

OTHER PUBLICATIONS

E. Bukstein, *Basic Servomechanisms*, 1963, pp. 158–160.

Primary Examiner—C. L. Albritton
Assistant Examiner—Alfred S. Keve
Attorney, Agent, or Firm—Sughrue, Mion, Zinn, Macpeak & Seas

[57] ABSTRACT

A control apparatus for an EDM machining device includes electrode a position control servo system provided with a zero order hold circuit. This circuit issues a position control instruction which is preset in an error counter which outputs an electrode difference signal used to drive the electrode. The difference signal is also applied to a processor or the like wherein it is added to the position control instruction and applied to the zero order hold circuit.

7 Claims, 4 Drawing Figures

ELECTROSPARK MACHINING CONTROL DEVICE

This application is a continuation of application Ser. No. 352,433, filed Feb. 25, 1982 now abandoned.

BACKGROUND OF THE INVENTION

This invention relates to an electrospark machining control device, and more particularly to one which controls a discharge gap with a servo system having sample, logic operation and hold functions.

In general, the servo system of an electric discharge machine should respond to an inter-electrode gap at the high speed, according to electric discharge conditions. For this purpose, servo actuators utilizing a hydraulic cylinder, a pulse motor or a DC servo motor have been used to drive the electrode, and a servo system having sample, logic operation and hold functions has been tried for controlling the inter-electrode gap. In the servo system, a general-purpose processing unit such as a micro-processor or a minicomputer can be used.

FIG. 1 shows one example of a conventional control device of this type, in which a DC servo motor is employed as an actuator 10. A pulse voltage, which is subjected to current control, is applied to an inter-electrode gap between an electrode 12 and the workpiece 14 from a pulse source 16. The inter-electrode voltage is digitalized by an analog-to-digital converter 18 and is then applied to a device 20 having the sample, logic operation and hold functions. In the device 20, the inter-electrode voltage is sampled by an input latch circuit 22 at predetermined intervals of time $\Delta t$. The inter-electrode voltage thus sampled is converted into a main shaft position instruction value by a logic operation circuit 24. This instruction value is held by an output latch circuit 26 until the next instruction value is provided. The instruction value is converted from a parallel digital output into a series digital output by a binary rate multiplier (BRM) 28, and is applied, as a count input, to an error counter 30 forming an electrode position servo system. In the counter 30, the amount of main shaft movement which is detected by a main shaft position detector 44, such as a linear encoder magnet scale, is subtracted from the instruction value. The result of this subtraction, namely, a position error signal, is converted into an analog signal by a digital-to-analog converter 32. The analog signal is applied, as a speed instruction signal, to a drive speed control servo system for the electrode 12, which includes a speed amplifier 34, a DC servo motor 36 and pilot generator 38, so that the DC servo motor 36 is rotated, to turn a drilling screw or worm gear 40, to thereby linearly move the main shaft 42 to which the electrode 12 is fixed. Thus, the DC servo motor 36 rotate until the displacement of the main shaft 42 becomes equal to the position instruction, thus controlling the inter-electrode gap.

The above-described control device has heretofore been used for position control according to numerical control (NC); that is, it is used to perform the so-called "variable value control". Therefore, the response speed of the position servo control thereof is on the order of 20 KHz at maximum, because in the conventional variable value control, accuracy in the static condition is essential, and therefore the higher response speeds are unnecessary. Therefore, as shown in FIG. 3, with respect to a ramp-shaped position instruction a from the BRM 28, the main shaft 42 follows a characteristic curve b, and accordingly with respect to the desired position $Z_1$ a droop $\Delta Z$ occurs at the point p, as measured at time t1.

On the other hand, in electrospark machining, follow-up control is effected with respect to the conditions of the inter-electrode gap, and therefore a response speed of 50 KHz at minimum is required for stable electrospark machining. Therefore, although the conventional control device as shown in FIG. 1 can position the electrode with high accuracy in the static condition, it is too inferior in response speed to be practically employed as a servo system under the dynamic conditions described above. In this respect, the above-described conventional control system is deficient.

SUMMARY OF THE INVENTION

In view of the above-described difficulties accompanying the conventional electrospark machining control device, an object of this invention is to provide an electrospark machining control device utilizing a servo system having sample, logic operation and hold functions, which can control electrode position with high accuracy and improve machining efficiency by increasing the response speed of the servo system.

The foregoing object of the invention has been achieved by the provision of a control device for an electrospark machining device in which a pulse voltage, which is subjected to current control, is applied to an inter-electrode gap between an electrode and a workpiece so that electric discharge takes place in the inter-electrode gap, and a position control servo system having sample, logic operation and hold functions controls the gap according to the voltage applied to the inter-electrode gap; in which, according to the invention, the position control servo system is provided with a zero-order hold circuit for issuing a position control instruction; an error counter for presetting an output of the hold circuit, as parallel data therein and for outputting the difference between the output thus preset and an electrode position signal from an electrode position detector; and a digital-to-analog converter for applying an output of the error counter, as a speed signal, to a servo system provided for driving the electrode, the sum of the output of the error counter and a value of the following position control instruction being applied to the zero-order hold circuit, to control electrode position.

DETAILED DESCRIPTION OF THE PREFERRED EMBODIMENTS

Figure 1:
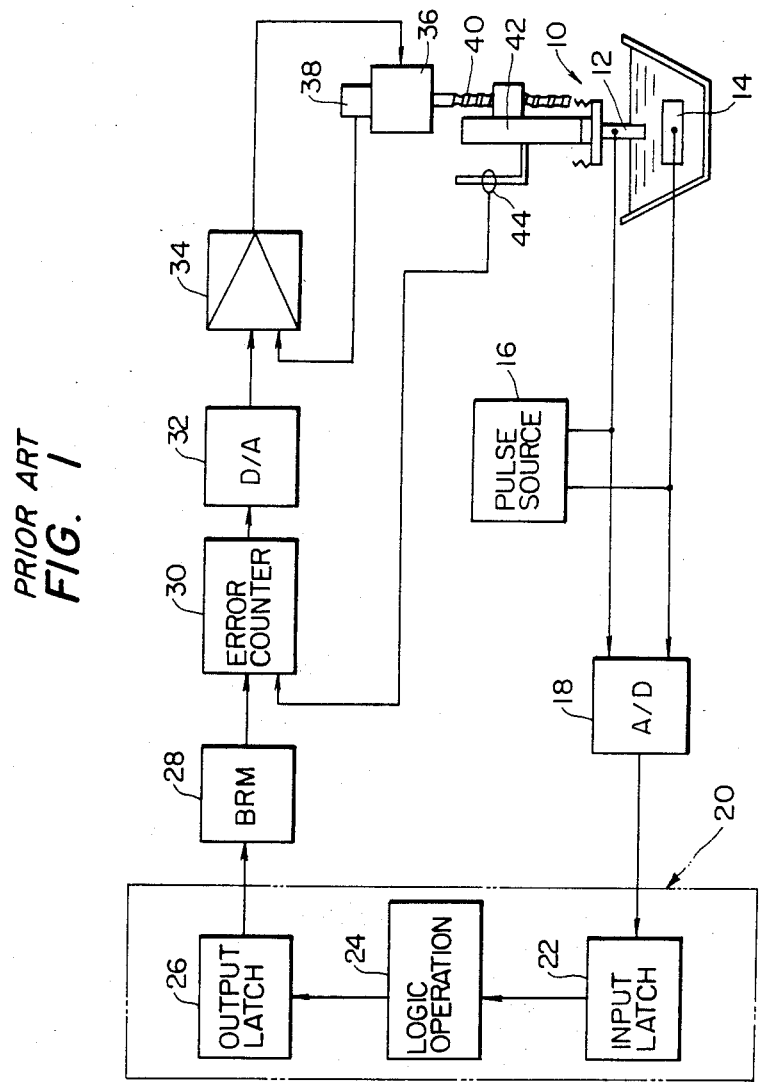
FIG. 1 is a circuit diagram showing one example of a conventional electrospark machining control device.
Figure 2:
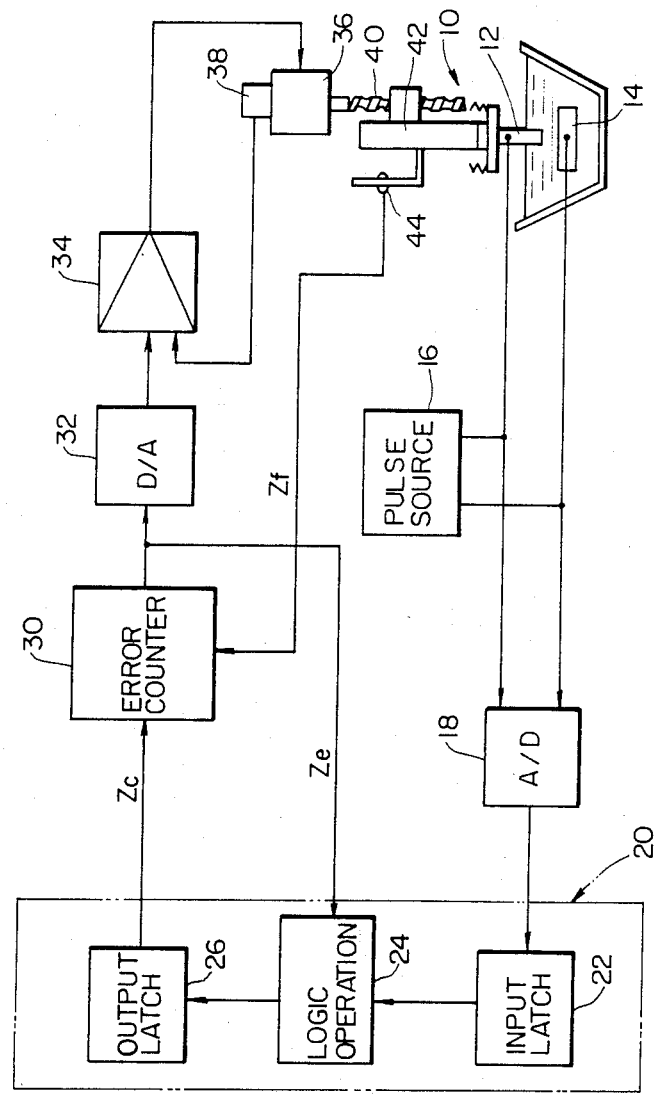
FIG. 2 is a circuit diagram showing one example of an electrospark machining control device according to the invention.
Figure 3:
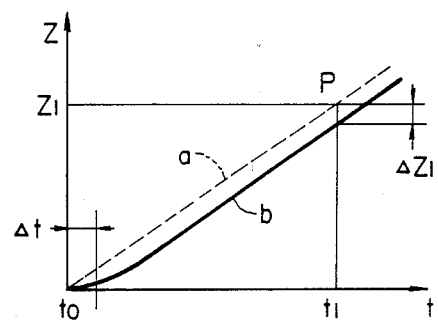
FIG. 3 is a graphic representation indicating the follow-up characteristic of the conventional device of FIG. 1.

FIG. 2 illustrates one example of an electrospark machining control device according to the invention. Some of the components forming the device are similar to those in the conventional device illustrated in FIG. 1, and are thus designated by the same reference numerals or characters. Therefore, only the difference between the two devices will be described in detail.

Similarly as was the case in FIG. 1, the signal representative of the inter-electrode voltage is digitalized, and is then converted into a main position instruction value at very short intervals of time $\Delta t$ by the device 20 having sample, logic operation and hold functions. The logic operation circuit 24 receives the difference (or the follow-up error) Ze output by the error counter 30, i.e., the difference between a zero-order hold output Zc and a position detection signal Zf, and adds it to the aforementioned main shaft instruction value, so that a zero-order hold output in the next interval of time $\Delta t$ is calculated in advance. Therefore, in spite of the zero-order hold control, in the position servo system a complete closed loop as to position is obtained, and the inter-electrode gap can be controlled with high accuracy. The zero-order hold output is preset, as parallel data, in the error counter 30 every very short interval $\Delta t$. When the zero-order hold output is preset in the error counter 30, the latter provides an impulse output, so that a sufficiently high start torque is imparted to the DC servo motor 36. In this connection, it goes without saying that the magnitude of the impulse signal is set to a value which will prevent over-shooting, when the characteristics of the DC servo motor 36, the load characteristic, and the predetermined short intervals $\Delta t$ are taken into account.

Figure 4:
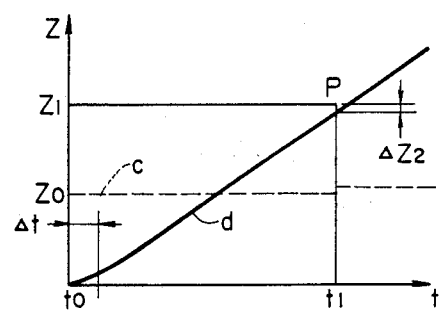
FIG. 4 is a graphic representation indicating the follow-up characteristic of the control device of the invention.

Accordingly, the position follow-up characteristic is as shown in FIG. 4. More specifically, with respect to the impulse-shaped position instruction c the main shaft 42 exhibits the follow-up characteristic d, and at the point p at the period of time $t_1$ only a very small error $\Delta Z_2$ occurs with respect to the desired position $Z_1$. Thus, the follow-up characteristic is considerably high in accuracy.

The device having the sample, logic operation and hold functions of the above-described embodiment may be replaced by hardwired logic, a microprocessor or the like. In this embodiment, a single axis is controlled; however, the technical concept of the invention can be equally applied to the case where multiple axes are controlled and interpolation is required.

As is apparent from the above description, in the present control device, the zero-order hold circuit and a complete closed loop are combined with the position servo system. Therefore, in the sample value servo operation, the response speed of the main shaft position system is not decreased. Furthermore, the inter-electrode gap can be controlled with high accuracy, whereby electrospark machining performance is improved.

What is claimed is:

1. A control device for an electrospark machining device in which a pulse voltage, which is subjected to current control, is applied to an inter-electrode gap between an electrode and a workpiece to be machined so that electric discharge takes place in said inter-electrode gap, and a position control servo system having sample, logic operation and hold functions controls the inter-electrode gap according to the voltage applied to the inter-electrode gap, said position control servo system comprising:
   a zero-order hold circuit for issuing a position control instruction;
   an error counter for presetting an output of said hold circuit, as parallel data therein and for outputting a difference between said output thus preset and an electrode position signal; and
   means for applying an output of said error counter, as a speed signal, to a servo system provided for driving said electrode; and to logic means provided in said position control servo system to provide a zero-order hold output for said zero-order hold circuit.

2. A control device as claimed in claim 1, said means for applying an output of said error counter comprising digital to analog converter means for applying an analog signal to said electrode driving means.

3. A control device as claimed in claim 2, said electrode driving means including a driving motor and gearing means for translating rotation of said motor into vertical movement of said electrode.

4. A control device as claimed in claim 1 or 2, the sum of said output of said error counter and a value of the following position control instruction being applied to said zero order circuit.

5. A control device as claimed in claim 4, said logic means including means for forming said sum.

6. A control device as claimed in claim 1, and including means for calculating a following zero order hold output in advance including means for summing an output of said error circuit and a position control instruction value.

7. A control device as claimed in claim 1, further comprising means detecting a position of said electrode for providing said electrode position signal.

* * * * *